Feb. 27, 1951 H. A. STAMPER 2,543,608

CALLING SYSTEM

Filed Aug. 5, 1946 2 Sheets-Sheet 1

INVENTOR
H. A. STAMPER

BY E. W. Woodbury

ATTORNEY

INVENTOR
H. A. STAMPER
BY E. Woodbury
ATTORNEY

Patented Feb. 27, 1951

2,543,608

UNITED STATES PATENT OFFICE 2,543,608

CALLING SYSTEM

Hamilton A. Stamper, Los Angeles, Calif., assignor to Bendix Aviation Corporation, South Bend, Ind., a corporation of Delaware Application August 5, 1946, Serial No. 688,400

8 Claims. (Cl. 177—353)

This invention relates to selective calling or ringing systems for use in electrical communication and is applicable to both telephone lines and to radio communication systems in which a plurality of stations operate on the same frequency channel or circuit. It is particularly useful in radio systems in which a very large number of stations operating on the same frequency are to be selectively called.

An object of the invention is to provide a practical selective calling system having a very large capacity.

Another object is to reduce wear in a selective calling system involving selective switches of the type employed in automatic telephony.

Another object is to reduce the cost of selective calling systems of large capacity.

Other more specific objects and features of the invention will become apparent from the detailed description to follow.

In general, systems of the type to which this invention relates employ dials at the calling end for generating a series of trains of pulses, and employ step by step selection switches at the receiving stations which are actuated by the pulses to close a bell circuit at the called station only. As an example, a system may employ at each receiving station a selection switch having seventeen positions which closes a local ringing circuit when it is moved into and stopped in the seventeenth position. The switches are further arranged so that the selection switch at the called station will, at the end of each train of pulses, stop in a position of rest, so that if the total number of pulses transmitted is equal to seventeen, the station will be called. On the other hand, the other stations will not have their switches moved into the seventeenth position in response to the same set of pulses because the positions into which such switches are moved by the same train of pulses are not positions of rest but instead are homing positions which cause those switches to step on around to their starting or home positions.

One feature of the present invention is a simple relay circuit for causing the switches at non-selected stations to rotate into home position.

Another feature of the invention involves apparatus for disabling the selection switches at a portion of the uncalled stations in response to the first train of pulses transmitted. This not only reduces the wear on the selection switches of the system but also increases the number of stations that can be selectively called without increasing the size of the selection switches.

A full understanding of the manner in which the invention functions, together with additional specific features thereof, will become apparent from the following detailed description when read in connection with the drawing, in which Fig. 1 is a schematic circuit drawing showing one embodiment of the invention.

A complete system incorporating the present invention would comprise one or more calling and a plurality of receiving stations, all interconnected by a common communication channel, with means at the calling station for transmitting a series of trains of pulses. Commonly the means for transmitting these pulses is an automatic dial switch such as is in use in automatic telephone systems. Such dials, as commonly constructed, are capable of transmitting a train of pulses having from one to ten pulses. By repeated dialing, any desired number of trains of pulses can be successively transmitted. Ordinarily in a system of the type here involved, the same number of trains of pulses is always transmitted. For example the various stations may be identified with different three digit numbers so that any station can be called by dialing three times.

Figure 1:
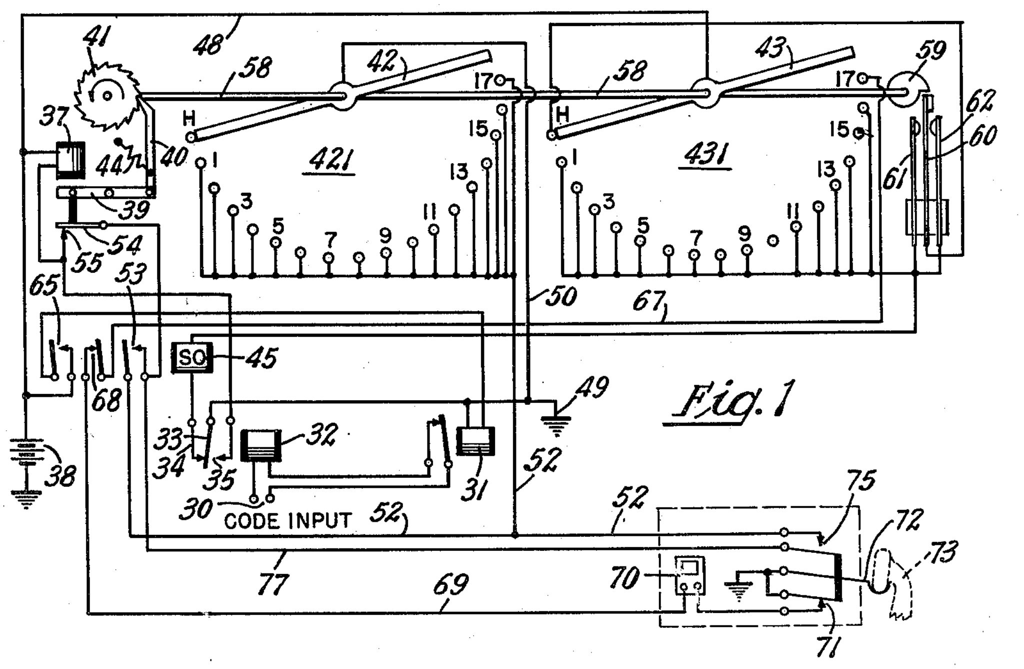

Only the apparatus at a receiving station is illustrated in Fig. 1. This system comprises a pair of input terminals 30 to which the trains of pulses are applied. From the terminals 30 the pulses are applied over normally closed back contacts of a muting relay 31 to the winding of a pulsing relay 32, causing the armature 33 of that relay to break from its rear contact 34 and make on its front contact 35 in response to each received pulse.

The armature 33 is directly connected to ground and each time it closes on the front contact 35 it completes a circuit through the winding of a stepping magnet 37 to a battery 38 and thence back to ground. This energizes the stepping magnet 37, causing it to pull its armature 39 and retract a pawl 40 associated with a ratchet wheel which actuates a shaft 58 having a pair of switch arms 42 and 43 of switches 421 and 431 respectively. When the stepping magnet 37 is deenergized following each pulse, a spring 44 restores the pawl 40, rocking the ratchet wheel 41 and the switch arms 42 and 43 one position in so doing. At the end of the first train of pulses the switch arms 42 and 43 at all of the stations will have been rocked into positions corresponding to the number of pulses in the train. At the called station this leaves the switch arm 43 on a dead contact. Thus, let it be assumed that the first train contained ten pulses so that the switch arms were moved onto the tenth contacts. It will be observed that the tenth contact for the switch arm 43 is open, whereas all of the contacts one to nine inclusive of the switch are connected together and through the winding of a slow to operate relay 45 to the back contact 34 of the relay 32, which, when relay 32 is deenergized, is connected to ground.

Whenever the switch arm 43 comes to rest on a contact that is connected through the winding of the relay 45 and the back contacts of relay 32 to ground, a circuit is completed over the switch arm 43, and a conductor 48 to the battery 38, thereby energizing the slow to operate relay 45 after a predetermined interval of time. This completes a circuit from the ground 49 over a conductor 50 to the switch arm 42 and thence over one of the contacts one to seventeen inclusive associated therewith, and over a conductor 52 and contacts 53 of the relay 45 through an armature 54 and back contact 55 of the stepping magnet 37, thence through the winding of the stepping magnet to the battery 38. This causes automatic repeated energizing of the stepping magnet 37 to step the switch arms 42 and 43 on around into home position. It will be observed that it is only in the home position that the switch arm 42 is not connected to the conductor 52. Hence at the end of the first train of pulses the switch arms 42 and 43 are restored to the home position at all stations having a first code number which is different from that of the called station.

It will be noted that during movement of the switch arm 43 it intermittently applies battery over its associated contacts to the winding of the slow to operate relay 45, and if special means were not provided to prevent it, this relay might pull in response to a long train of pulses.

Figure 3:
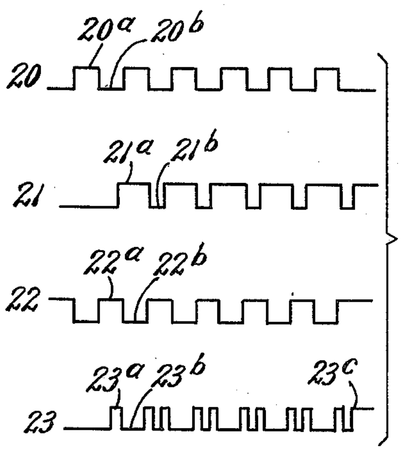
Fig. 3 is a graph illustrating the operation of the system.

The special means for preventing unwanted operation of the relay 45 includes the armature 33 and back contact 34 of the relay 32. Each time the relay 32 pulls in response to the receipt of a signal pulse, it opens its armature 33 off its back contact 34, thereby momentarily interrupting the current flow through relay 45. Thus referring to curve 20 of Fig. 3, during each pulse 20*a*, the relay 32 and the stepping magnet 37 are energized and during each interval 20*b* between successive pulses the relay 32 is deenergized to complete the circuit for relay 45 and the stepping magnet 37 is deenergized to step the switch arms 42 and 43 into their next positions. It will be observed that during a portion of the interval while the switch arm 43 is resting on one of its contacts to complete the circuit from the battery 38 up to one side of the winding of relay 45, the armature 33 of relay 32 is opened away from the back contact 34 to interrupt the circuit from the other side of the winding of relay 45 to ground. Thus referring to curve 21 of Fig. 3, potential is applied from the battery 38 to the upper side of the winding of relay 45 during the intervals 21*a*, while the switch arm 43 is resting on a contact, and is disconnected during the intervals 21*b* while the arm 43 is moving between contacts. Referring now to curve 22, the lower side of the winding of relay 45 is connected to ground over the back contact 34 of the relay 32 during the intervals 22*a* but is disconnected from ground during the intervals 22*b*. Therefore as shown by curve 23 a complete circuit for flow of current through the winding of relay 45 is completed only during the short intervals 23*a* and is interrupted during the intervals 23*b* until the switch arm 43 comes to rest on a contact, whereupon the energizing circuit for the relay 45 is completed continuously as indicated by the portion 23*c* of curve 23.

The joint chopping of the energizing current for relay 45 by the switch arm 43 and the back contact 34 of relay 32 during receipt of a train of pulses is positively effective to prevent the operation of the relay 45 while a train of pulses is being received.

Immediately following receipt of the first train of pulses, the switch arms 42 and 43 are restored to home position at all of the stations where the first digit of the calling code is different from the first digit of the calling code of the called station. Furthermore these stations are disabled and prevented from responding to succeeding trains of the code signal in the following manner:

It will be observed that at the right end of the shaft 58 on which the switch arms 42 and 43 are mounted, there is a spiral cam 59 which cooperates with a tuned reed contact 60, which when vibrated alternately makes contact with a pair of reeds 61 and 62. Normally the reed 60 when at rest is out of contact with both the reeds 61 and 62. The vibratory reed 60 is connected to the homing (H) contact associated with the switch arm 43 so that when this switch is in home position the reed 60 is connected to the battery 38. The two reeds 61 and 62 are connected together and to the upper end of the winding of relay 45. When the switch arm 43 is in home position and the vibratory reed 60 is stationary, there is no connection from the battery 38 through the homing contact to the winding of relay 45. However as the switch arm 43 moves into home position the cam 59 releases the reed 60 from a deflected position into which it has been previously moving the reed, so that the reed vibrates and intermittently connects the battery 38 to the winding of relay 45. At the same time, the other side of the relay winding is connected to ground over the back contact 34 of the relay 32 despite the receipt of further trains of pulses to the code input terminals 30, because the energization of relay 45 closes a pair of contacts 65 thereof which complete a circuit from the battery 38 to the muting relay 31, the back contacts of which are connected in series with the winding of the pulsing relay 32.

The vibratory reed 60 is so designed as to continue to vibrate for a period in excess of that required to transmit a full series of trains of pulses and thereby disable the operation of the switch arms 42 and 43 during the transmission of the trains of pulses following the first train. When the reed 60 stops vibrating, the flow of current to the winding of relay 45 is broken, and the relay releases, restoring the system to normal.

At the called station the effect of the first train of pulses is to move the switch arm 43 onto a dead contact which as shown in Fig. 1 is the tenth contact. Therefore the switch arms 42 and 43 remain on their tenth contacts following receipt of the first train of pulses, and the second train of pulses steps the arms on around beyond the tenth contact or position. The station illustrated in Fig. 1 is designed to respond to the code 052. Therefore the second train of five pulses moves the arm 43 from the tenth contact to the fifteenth contact, which is also dead, and the switch arms 42 and 43 remain on their fifteenth contacts following receipt of the second train of pulses. On the other hand, other stations having the same first code digit as the called station, but having a different second code digit, would complete their homing circuits and be restored to homing position, actuating their vibratory reeds 60 in so doing to thereby disable the systems during remainder of the signal. Of course all stations having the same first and second digits in their codes as the called station will have their arms 42 and 43 moved onto their fifteenth contacts following receipt of the second train of pulses.

The third train of pulses comprises two pulses which step the arms 42 and 43 into their seventeenth positions. This completes a circuit from the battery 38 over the conductor 48 and the selector switch arm 43 to the seventeenth contact and thence over a conductor 67 and over back contacts 68 of the slow to operate relay 45 and a conductor 69 through a bell 70 and over contacts 71 of a receiver hook 72 to ground, causing the bell 70 to ring.

The contacts 68 prevent false ringing of the bell 70 during automatic homing operation, when the relay 45 is actuated.

When the call is answered, as by lifting a telephone receiver 73 off the hook 72, the bell circuit is opened at the contact 71. At the same time, a circuit from ground 49 is completed over the conductor 50, the switch arm 42 and its associated seventeenth contact, thence over conductor 52 and contacts 75 of the receiver hook switch 72 and over a conductor 77 to the armature 54 of the stepping magnet 37, causing the latter to step the switch arms 42 and 43 into home position.

Figure 2:
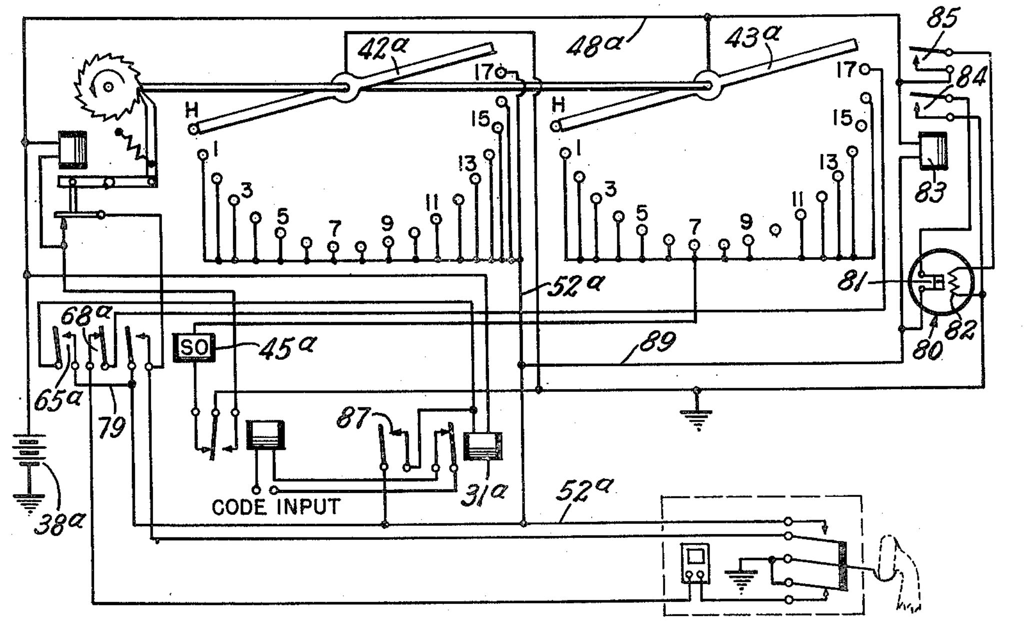
Fig. 2 is a schematic diagram similar to Fig. 1 but showing a variation thereof.

The circuit shown in Fig. 2 is essentially the same as the circuit of Fig. 1 except that a thermal time delay switch 80 and relay 83 are employed in place of the switch employing the vibrating reed 60 of Fig. 1, for disabling the apparatus at the uncalled stations following receipt of the first train of pulses.

As soon as the switch arm 42*a* moves out of the home position, it completes a circuit from ground to the conductor 52*a* and thence over a conductor 89 and through the winding of the relay 83 to the conductor 48*a* which is connected to the battery 38*a*, thereby actuating the relay 83. A heater 82 in the thermal relay 80 is thereupon energized over a circuit which can be traced from ground through the heater 82, thence through the contacts 85 of the relay 83 and over the conductor 48*a* to the battery 38*a*. At the same time, the relay 83 completes a holding circuit for itself through the normally closed contacts 81 of the thermal relay 80 and through the contacts 84 of relay 83 to ground.

It will be observed that when the selection switches 42*a* and 43*a* stop in a position corresponding to a digit different from the code digit of the station that is being considered, the slow to operate relay 45*a* is actuated as previously described in connection with Fig. 1.

The system of Fig. 2 differs from that of Fig. 1 in that in the latter circuit the vibrating reed 60 maintained the slow to operate relay 45 energized following movement of the selector switch arm 43 into home position. In contrast, in Fig. 2 there is no such holding circuit for the relay 45*a*, and it releases following movement of the switch arm 43*a* into home position.

In either Fig. 1 or Fig. 2 the muting relay 31 or 31*a* will not respond until the relay 45 or 45*a* is fully actuated. This insures against undesired muting of incoming signals even though those signals should cause some fluttering of the relay 45 or 45*a*. In some instances the muting relays can be eliminated and their function performed by contacts on the relay 45 or 45*a*, when the latter relay is so designed that it is not subject to fluttering.

However, in Fig. 2 the muting relay 31*a* has a holding circuit and differs in this respect from the relay 31 of Fig. 1. This holding circuit for the relay 31*a* extends from the winding of the relay through the contacts 87 thereof to the conductor 52*a* and thence over the conductor 89 and through the contacts 81 of the thermal relay 80 and the contacts 84 of the relay 83 to ground.

After the lapse of a period of time greater than that required to transmit the remaining trains of signal pulses, the contacts 81 of the thermal relay 80 open, thereby releasing the relay 83 and the relay 31*a*, the holding circuits of which included the contacts 81. The release of relay 83 opens the heater circuit at contacts 85.

Except as described, the circuit of Fig. 2 corresponds in circuit and functioning to that of Fig. 1.

Figure 4:
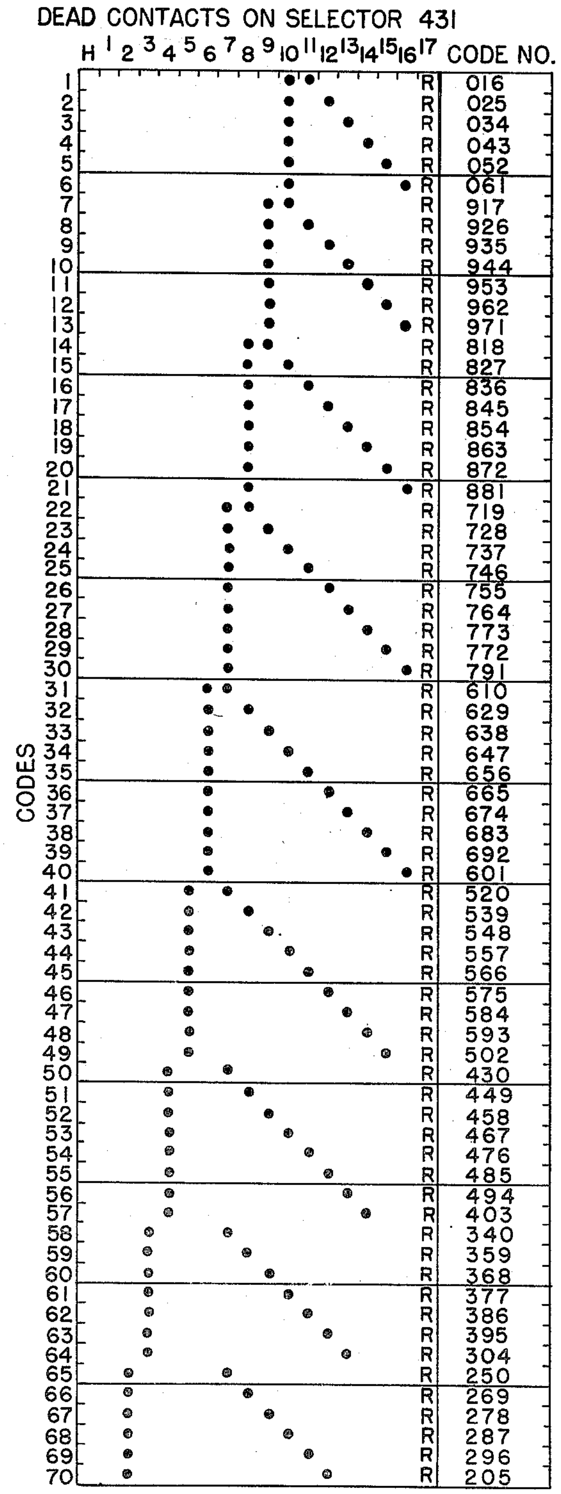
Fig. 4 is a diagram illustrating the codes that may be employed in a system in accordance with the invention.

The diagram of Fig. 4 illustrates the different codes that are possible in a system in accordance with the invention employing a maximum of three trains of pulses in each signal. It will be observed that with the use of only three-digit codes, 75 selections can be made.

It will be noted from inspection of Fig. 4 that six stations can have ten pulses in their first train of signals, seven stations can have nine pulses, eight stations can have eight pulses, nine stations can have seven pulses, ten stations can have six pulses, nine stations can have five pulses, eight stations can have four pulses, seven stations can have three pulses and six stations can have two pulses. In each group of stations having the same number of pulses in their first train, the number of pulses in the second and third trains are always such as to add up to the same sum.

In a system employing a three-digit code and in which the single code digit "1" is reserved for other signaling purposes, the number of stations is increased from sixty to seventy by the present system because of the muting of all stations having different codes from that of the station being called. This is true because it permits the use of the number 1 as either the second or third digit of a code, whereas when muting as herein described is not used, no codes employing 1 as any digit can be used. In systems employing codes containing more than three digits, the advantage is proportionately greater.

Although for the purpose of explaining the invention a specific embodiment thereof has been described in detail, the invention is to be limited only to the extent set forth in the appended claims.

I claim:

1. Apparatus for use in a signaling system having a plurality of stations on a common signaling channel adapted to be selectively called in response to a series of trains of signal pulses, said apparatus comprising: a stepping selector switch having a home position, and a calling position, and having a resting position and a plurality of clearing positions intermediate said home and said calling positions; means for stepping said switch in response to a train of pulses a distance proportional to the number of pulses in that train; clearing means effective when energized to step said switch into home position; and means including clearing contacts of said switch in said clearing positions for energizing said clearing means.

2. Apparatus as described in claim 1 in which said means for stepping said switch includes a pulsing relay having a winding to which said pulses are applied and having a front contact for energizing said switch, and said means for energizing said clearing means includes a slow-operating relay and an energizing circuit therefor including said clearing contacts of said switch and a back contact on said pulsing relay; said switch being of such construction as to close on each clearing contact following reception of each pulse, whereby the energizing circuit for said slow-operating relay is open at said back contact of said pulsing relay while said switch is closed on a clearing contact during reception of the succeeding pulse.

3. Apparatus as described in claim 1 in which said means for energizing said clearing means includes a slow-operating relay effective when actuated to energize said clearing means; means including said clearing contacts for preparing an energizing circuit to said slow-operating relay; and means responsive to cessation of pulses for completing said energizing circuit to said slow-operating relay.

4. Apparatus as described in claim 1 including disabling means responsive to movement of said switch into home position for rendering said apparatus non-responsive to received signal pulses for a predetermined interval thereafter.

5. Apparatus as described in claim 1 including disabling means responsive to movement of said switch into home position for rendering said apparatus non-responsive to received signal pulses for a predetermined interval thereafter; said disabling means comprising a vibratory reed and contact means closed in response to vibration thereof and means for setting said reed into vibration in response to movement of said switch into home position.

6. Apparatus as described in claim 1 in which said means for energizing said clearing means includes a slow-operating relay effective when actuated to energize said clearing means; means including said clearing contacts for preparing an energizing circuit to said slow-operating relay; means responsive to cessation of pulses for completing said energizing circuit to said slow-operating relay; disabling means responsive to movement of said switch into home position for rendering said apparatus non-responsive to received signal pulses for a predetermined interval thereafter, said disabling means comprising a vibratory reed and contact means closed in response to vibration of said reed; means for setting said reed into vibration in response to movement of said switch into home position; a holding circuit for said slow-operating relay including said contact means; and switching means responsive to actuation of said slow-operating relay for rendering said apparatus non-responsive to received signal pulses.

7. Apparatus as described in claim 1 including disabling means responsive to movement of said switch into home position for rendering said apparatus non-responsive to received signal pulses for a predetermined interval thereafter; said disabling means comprising a time delay relay having contacts actuated a predetermined time following energization thereof; means for energizing said relay in response to received pulses; means responsive to energization of said clearing means for rendering said apparatus non-responsive to received pulses, and responsive to actuation of said time delay relay contacts for again making said apparatus responsive to received pulses.

8. Apparatus for use in a signaling system having a plurality of stations on a common signaling channel each adapted to be selectively called in response to a series of trains of signal pulses, each station apparatus comprising: a stepping selector switch having a home position, a calling position, a resting position and a plurality of clearing positions intermediate said home and said calling positions; means for stepping said switch in response to a train of pulses a distance proportional to the number of pulses in that train; clearing means effective to control said switch to cause it to return to home position; and means including clearing contacts of said switch in said clearing positions for controlling said clearing means.

HAMILTON A. STAMPER.

REFERENCES CITED

The following references are of record in the file of this patent:

UNITED STATES PATENTS

| Number | Name | Date |
|---|---|---|
| 2,157,848 | Crocker | May 9, 1939 |
| 2,203,756 | Urban | June 11, 1940 |
| 2,446,943 | McGoffin | Aug. 10, 1948 |